United States Patent
Coleman et al.

(10) Patent No.: US 6,727,915 B2
(45) Date of Patent: Apr. 27, 2004

(54) INTERACTIVE STREAMING MEDIA PRODUCTION TOOL USING COMMUNICATION OPTIMIZATION

(75) Inventors: Mike Coleman, Portland, OR (US); Alexander MacAulay, Rennes (FR)

(73) Assignee: Envivio, Inc., South San Francisco, CA (US)

( * ) Notice: Subject to any disclaimer, the term of this patent is extended or adjusted under 35 U.S.C. 154(b) by 242 days.

(21) Appl. No.: 10/076,879

(22) Filed: Feb. 13, 2002

(65) Prior Publication Data

US 2002/0154125 A1 Oct. 24, 2002

Related U.S. Application Data

(60) Provisional application No. 60/286,021, filed on Apr. 23, 2001.

(51) Int. Cl.[7] .............................................. G06T 11/00
(52) U.S. Cl. ..................................... 345/744; 345/723
(58) Field of Search ................................. 345/723, 753, 345/744, 746, 747, 440, 440.1; 725/61, 51, 52, 89, 91, 109, 114; 707/104.1; 715/500.1, 501.1; 348/207.11, 211.99; 382/233, 235; 375/228

(56) References Cited

U.S. PATENT DOCUMENTS 6,011,868 A * 1/2000 van den Branden et al. ..... 382/233
6,249,281 B1 * 6/2001 Chen et al. .................. 345/753
6,360,234 B2 * 3/2002 Jain et al. ................ 715/500.1
6,564,380 B1 * 5/2003 Murphy ....................... 725/86

* cited by examiner

Primary Examiner—Almis R. Jankus
(74) Attorney, Agent, or Firm—Swernofsky Law Group PC

(57) ABSTRACT

The invention provides interactive streaming mixed media production. A mixed media content creation tool includes a resource-computation element that computes the likely resource load to be imposed on a server, communication link, and client device, when sent by the server to the client and presented to a user at the client. The resource-computation element is responsive to amounts of communication bandwidth available using the communication link, presentation buffer space and computing resources available at the client, and other measures of resource load. The resource-computation element attempts to optimize resource usage by the mixed media content. The system also includes a presentation element that responds to the resource-computation element, and to user requests, and interactively presents measures of projected resource usage by the mixed media content, comparisons of that projected resource usage with available resources, and comparisons of that projected resource usage before and after optimization.

25 Claims, 4 Drawing Sheets

INTERACTIVE STREAMING MEDIA PRODUCTION TOOL USING COMMUNICATION OPTIMIZATION

BACKGROUND OF THE INVENTION

1. Field of the Invention

This invention relates to an interactive streaming media production tool.

2. Related Art

The art of producing mixed media scenes has progressed to where individuals are able to create their scene compositions at a workstation, using appropriate software. These mixed media scenes are called "mixed media content"; the associated software is called an "authoring tool"; and the persons creating the video content are called "content creators". After creation, mixed media content can be disposed at a server and sent, using any streaming or broadcast technique, to a client for presentation to a user.

One problem in the known art is that content creators are very concerned by the quality versus resource occupation tradeoff their mixed media content imposes (on the server, the client, and the communication link between them) when sent from the server to the client and presented to the user. In existing audiovisual systems, fixed resource usage schemes are the most common way to solve this problem, but this is obviously non-optimal. More sophisticated policies include algorithms to balance between peaks and lows so that a level of non-constant resource usage can be tolerated (for instance for bandwidth or memory usage), as this can increase quality quite significantly. However, these resource control mechanisms are not available to the content creator directly, but to skilled engineers who are able to tune these complex algorithms. Mixed media content adds to the flexibility as it is possible to adjust the resource usage by modifying the advent or coding scheme of some media in the broadcast in order to fulfill the given constraints. If the content requires more resources for transmission or decoding than available, presentation of that content can be degraded or inaccurate, and exhibit jerkiness or other artifacts that make it unpleasant to watch and degrade any intended message or effect of that video content.

Moreover, creation of mixed media content is often complex, involving integration of objects to be displayed, locations and times at which those objects are to be displayed, and a set of possible special effects, such as texture and transparency, fade in and out, and the like. It would be advantageous to allow content creators to interactively (as they are creating video content) use information about the resource load likely to be imposed by the content they are creating. Preferably, that resource load information would be responsive not only to the mixed media content itself, but also to characteristics of the server, the client, and the communication link between them.

Accordingly, it would be desirable to provide a new technique for interactive streaming mixed media production.

SUMMARY OF THE INVENTION

The invention provides a method and system for interactive streaming mixed media production. In a preferred embodiment, a mixed media content creation tool includes a resource-computation element (also referred to as the "core") that computes the likely resource load to be imposed on a server, communication link, and client device, when sent by the server to the client and presented to a user at the client. The resource-computation element is responsive to amounts of communication bandwidth available using the communication link, presentation buffer space and computing resources available at the client, and other measures of resource load. The resource-computation element attempts to optimize resource usage by the mixed media content (such as, for example, rearranging the timing of sending elements within the video content to maintain communication bandwidth within an associated limit and while simultaneously maintaining buffer space within another associated limit). The system also includes a presentation element that responds to the resource-computation element, and to user requests, and interactively presents measures of projected resource usage by the mixed media content, comparisons of that projected resource usage with available resources, and comparisons of that projected resource usage before and after optimization.

The invention has general applicability to interactive computation of resource usage in the design of mixed media presentations, not limited specifically to streaming media, and not necessarily related to the specific applications disclosed herein. For example, embodiments of the invention can include one or more of, or some combination of, the following applications:

Media other than streaming mixed media, such as general purpose data transfer;

Optimization of resource usage when the resources are other than communication band-width or buffer space.

Moreover, techniques used by a preferred embodiment of the invention for interactive computation of resource usage can be used in contexts other than the specific applications disclosed herein. For example, techniques used by embodiments of the invention for optimization of sending streaming mixed media objects, fitting resource load within multiple constraints, and presentation of resource load in relation to constraints, are all generally applicable to fields other than the specific applications disclosed herein.

DESCRIPTION OF THE PREFERRED EMBODIMENT

The invention is described herein with regard to preferred steps and data structures. Those skilled in the art will recognize, after perusal of this application, that the described steps and data structures are not limited to any particular processing devices (whether general-purpose or special-purpose processing devices, or specific circuitry). Rather, those of ordinary skill in the art would be able to implement the described steps and data structures, and equivalents thereof, without undue experimentation or further invention. All such implementations are within the scope and spirit of the invention.

Lexicography client and server—as used herein, the phrases, "client" and "server" refer to a relationship between two devices, particularly to their relationship as client and server, not necessarily to any particular physical devices.

client device and server device—as used herein, the phrase "client device" includes any device taking on the role of a client in a client-server relationship (such as an HTTP web client and web server). There is no particular requirement that any client devices must be individual physical devices; they can each be a single device, a set of cooperating devices, a portion of a device, or some combination thereof. As used herein, the phrase "server device" includes any device taking on the role of a server in a client-server relationship. There is no particular requirement that server devices must be individual physical devices; they can each be a single device, a set of cooperating devices, a portion of a device, or some combination thereof.

streaming media—in general, a time-varying sequence of data (including images or information) intended for presentation to a recipient. For example, streaming media can include animation, audio information, motion picture or video information, still pictures in sequence, or other time-varying data. In a more general sense, streaming media can include non-visual data such as stock market information or telemetry.

System Elements

Figure 1:
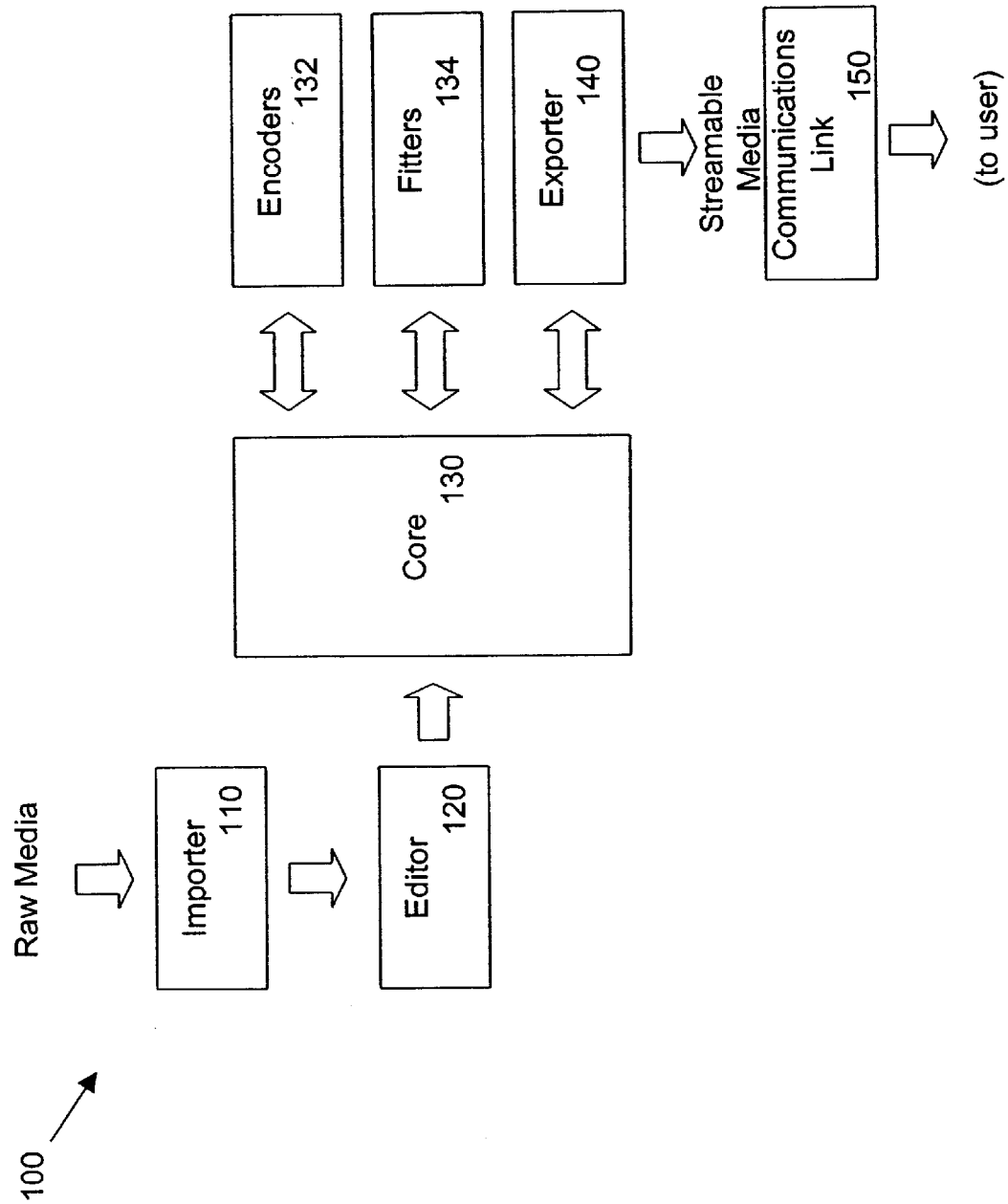
FIG. 1 shows a block diagram of a system for interactive streaming media production.

FIG. 1 shows a block diagram of a system for interactive streaming media production.

A system for interactive streaming media (shown by general character reference 100) includes an importer 110, an editor 120, and a core 130, an exporter 140 and a communications link 150.

The importer 110 receives raw media such as TV images, formatted text, vector graphics, animated graphics, still graphics, and other types of media. This raw media is stored in a memory until it can be further manipulated or transmitted to the core element 130.

The editor 120 includes a software module 122, an input element 124 and an output element 126. The input element 124 (such as a keyboard, mouse or pointing device) is manipulated by a content creator to generate commands for editing media. The output element 126 displays the media, editing tools and other graphical elements related to the computation and display of streaming media such as timelines and other representations to the content creator. These graphical representations are further described in FIG. 4.

The core element 130 stores the logical representation of the scene being composed, as well as encoding and transmission parameters for that scene. It receives user commands from the editor 120 and notifies the editor 120 of any change for user presentation purposes. The editor 120 acts as a front end of the core 130, which in turn handles the basic data structures for the scene. In a preferred embodiment, the core 130 is coupled to multiple editors 120. In other embodiments, the core 130 is coupled to a single editor 120.

The core 130 is coupled to a set of encoders 132 and a set of fitters 134. In one embodiment, there is a different encoder 132 for each different type of media stream. For example, separate encoders 132 are associated with the audio portion and the video portion of a media stream. Encoding is performed when the content creator wishes to preview what the end user will see.

In a preferred embodiment, the encoders 132 receive the raw media and convert it into a form that is compatible with other elements included in the system 100. The encoders 132 include various techniques and conversion algorithms for converting the various types of raw media such as audio, video, graphics (including bit mapped formats and vector formats) and images to a different format that can be more readily manipulated. For example, the encoder includes a technique for converting GIF (graphics interchange format) to MP4. The encoders 132 may also include conversion algorithms for converting vector formats or other bitmap formats such as animated GIFS to MP4. Similarly, the encoders 132 include a technique for converting WAV files into MPEG 4 files.

In some embodiments of the invention, the encoder 132 also "packetizes" the sample by dividing that sample into multiple data packets, such that the size of each data packet is smaller that the maximum packet size minus the overhead imposed by the transport protocol. In alternative embodiments, packetization is performed as part of the fitting algorithm described in the text relating to FIG. 2.

The fitter 134 includes an algorithm for distributing the different media data across the transmission timeline according to resource occupancy, from which can be deduced their respective download time. This algorithm allows a user to construct MP4 files containing media samples to be sent over a network in such a way that the transmission does not impose excessive bandwidth requirements while being able to monitor the download time. Factors in this in this algorithm include (1) calculating the bit rate of a data stream, (2) estimating the buffer capacity available to an end user, (3) calculating the optimal "send time" for sending data packets related to the transmission of an object for different media elements. This algorithm is described in further detail in the text relating to FIG. 2.

In one embodiment, the fitter 134 responds dynamically to changes that the user makes to a media stream by generating a graphical image that is responsive to the media. This graphical image is displayed on the editor 120. In other embodiments, refitting is performed every n changes in a data stream (for selected n), or at fixed intervals in time or at the user's discretion.

The exporter 140 converts the streaming media into a form such that it can be transmitted over a communications link 150 to an end user. The communications link 150 can include a computer network, such as an Internet, intranet, extranet or a virtual private network. In other embodiments, the communication link 150 can include a direct communication line, a switched network such as a telephone network, a wireless network, a form of packet transmission or some combination thereof. All variations of communication links noted herein are also known in the art of computer communication.

Figure 2:
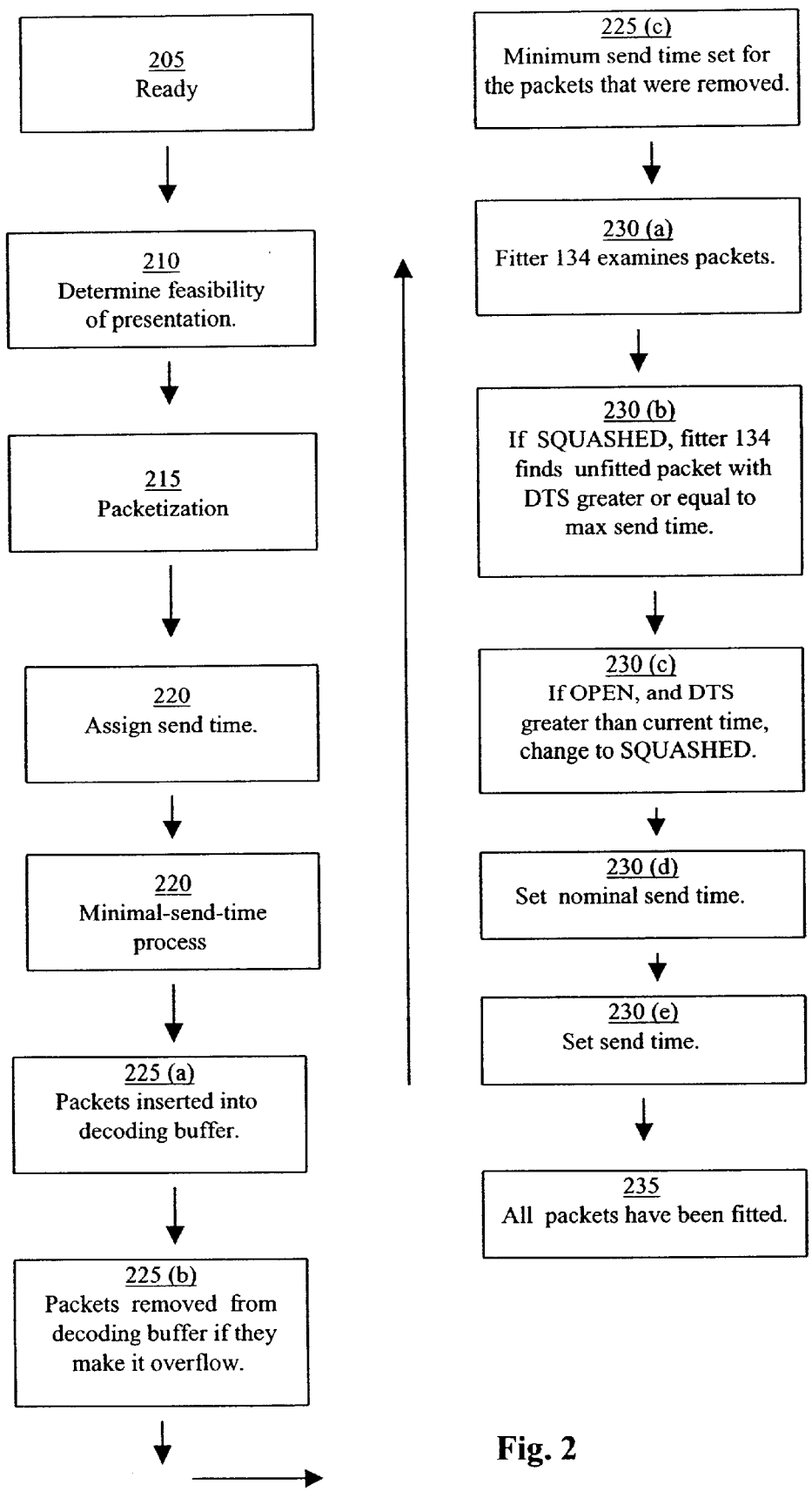
FIG. 2 shows a process flow diagram of the fitting process.

FIG. 2 shows a process flow diagram of the fitting process.

In a step 205, the fitter 134 receives input values from which it can determine an optimal packet size for the distribution of an MPEG4 file over a network so that the transmission does not impose excessive bandwidth requirements. In one embodiment, the inputs include at least the following parameters:

Available channel bandwidth as a function of time. Available channel bandwidth may change over time, especially if there are other presentations streamed over the same channel during the presentation.

Maximum packet size

The time offset for each stream included in the presentation. This is the time that the stream has to start so as to be integrated into the presentation.

The maximum permitted "send-ahead" time. This is a maximum time ahead of actual presentation that streaming media data is allowed to be sent. In a preferred embodiment, this limit is set by the network system. It is similar to a time-out parameter.

In a step 210, the fitter 134 determines whether the presentation will be feasible, given the parameters enumerated in step 205. If the presentation is not feasible, the content creator can evaluate what to include or exclude from the presentation in light of its overall feasibility. Regardless of feasibility, the method proceeds at step 215. If the content creator does not modify the presentation so as to make it feasible, either (1) the end user may receive a degraded product, (2) there may be network overload, or both. If there is network overload, the end user will miss some part of the presentation. For example, if a satellite network is used to transmit the packets becomes overloaded, the network will not transmit all of packets and the user will miss portions of the presentation.

In a step 215, a packetization algorithm is performed. The bytes in the sample are divided into multiple portions such that the size of each portion is smaller that the maximum packet size minus the overhead of the transport protocol. Packets are constructed such that the payload of each packet includes the portion of the sample. The headers of the packets include the headers of the transport protocol. The overall packet size is equal to the header size plus the payload.

In a step 220, the fitter 134 assigns a different "send time" to each packet. This step is not performed if the encoder 132 has already divided the sample into packets.

In a step 225, a minimal-send-time process is performed for every packet. This process defines the earliest point in time that the packet can be sent with respect to the maximum permitted send ahead time and the maximum permitted decoding buffer size. This is be calculated by simulating the actions of the decoder in buffering the streaming media data using the following sub-steps:

In a substep 225(a), packets are inserted into a simulated decoding buffer in the order of ascending DTS (decoding time stamp).

In a substep 225(b), the packet with the smallest DTS is removed from the simulated decoding buffer when the sum of the payload sizes of the packets in the decoding buffer exceeds the maximum permitted decoding buffer size.

In a substep 225(c), the minimum send time of the removed packet is set to the maximum of either the (1) the DTS of the current packet minus the maximum permitted send-ahead time or (2) the DTS of the most recently removed packet from the decoding buffer, depending upon which is higher.

Substeps 220(a) through 225(c) are repeated with additional packets being added until a minimal send time has been calculated over every packet. This minimal send time is not necessarily the actual send time.

In a step 230, the actual fitting takes place, starting with the data packets at the end of the presentation and moving towards those packets associated with the beginning of the presentation. The fitter 134 has two modes: "OPEN" or "SQUASHED". If the fitter 134 is in OPEN mode, then the instantaneous bit rate is less than the instantaneous maximum bit rate, and the limit of the send time has not been reached with respect to the fitted bit rate. If the fitter is in SQUASHED mode, then the instantaneous fitted bit rate is equal to the instantaneous bit rate, and another packet cannot be sent at the current time without exceeding the limit. Initially, the mode of the fitter 134 is OPEN and the current time is equal to the duration of the presentation. Fitting involves the following substeps:

In a substep 230(a), the mode is open. The fitter 134 examines all packets in all streams included in the presentation and identifies the unfitted packet with the greatest DTS.

In a substep 230(b), the fitter 134 determines whether it is OPEN or SQUASHED. If the mode is SQUASHED, the fitter 134 finds the unfitted packet with the DTS greater than or equal to the current time with the greatest minimum send time. If no such packet exists, the mode changes to OPEN and the fitter returns to step 225(a) to find another packet.

In a substep 230(c), the fitter 134 determines whether it is OPEN or SQUASHED. If the node is OPEN, and the DTS of the found packet is greater than the current time, the mode changes to SQUASHED, and the method 200 returns to step 225(b) to find another packet.

In a substep 230(d), the nominal send time of the packet is set to the minimum of the current time and the DTS of the packet.

In a substep 230(e), the send time of the packet is set to the nominal send time minus the size of the packet divided by the available bandwidth at the nominal send time.

The packet is now fitted; method 200 proceeds at step 230(a) and continues until there are no more unfitted packets. In the event that the send time of the packet is less than its minimum send time, the fitter 134 cannot fit the presentation and the fitter 134 terminates.

In a flow point 235, all packets have been fitted and the method is complete.

Method of Operation

Figure 3:
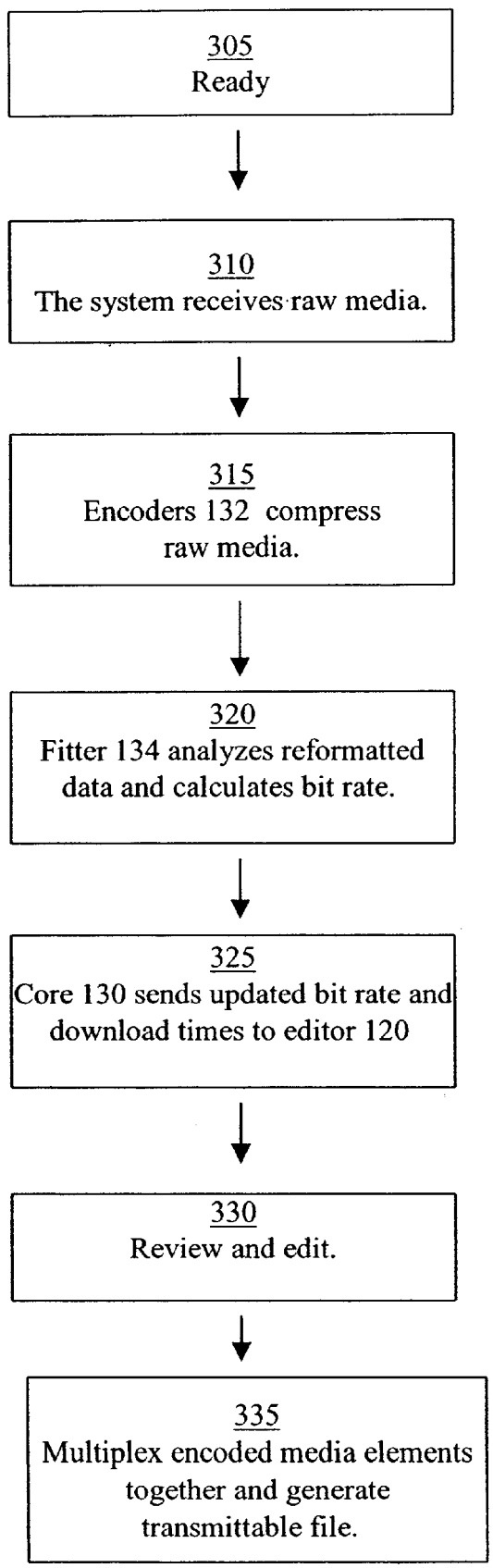
FIG. 3 shows a process flow diagram of a method for interactive streaming media production.

FIG. 3 shows a process flow diagram of a method for interactive streaming media production.

The method 300 is performed by the system 100. Although the method 300 is described serially, the steps of the method 3200 can be performed by separate elements in conjunction or parallel, whether asynchronously, in a pipelined manner, or otherwise. There is no particular requirement that the method 300 be performed in the same order in which this description lists the steps, except where so indicated.

In a flow point 305, the system 100 is ready to begin monitoring a media stream and dynamically providing information about that data stream to a content creator.

At a step 310, receives raw media, including audio, video, formatted text, vector graphics, animated graphics, still graphics and other images. This raw media is stored in a memory where it can be further manipulated.

At a step 315, the encoders 132 encode the raw media from its original format, to generate media in a compressed format that is compatible with other elements in the system 100. In one embodiment, this includes converting bitmap formats (such as GIF) and vector formats to MP4.

Simultaneously, content creators may compose media or add media objects to the encoded media. This includes adding new elements (such as banner advertisements, texture, sounds and other objects) and changing the attributes of these objects.

In a step 320, the fitter 134 analyzed the encoded and manipulated media and compare the resource usage to the available ones. The resources may include the available bandwidth, the type of equipment that an end user will use to view the media, the type of server that will be used to transmit the media to the end user, and the nature of the communications link 150. The fitter 134 also calculates the bit rate of a data stream, (2) estimates the buffer capacity available to an end user and (3) calculates the optimal "send time" for sending data packets related to the transmission of an object for different media elements.

In a step 325, the core 130 sends updated bit rate usages and download time for each media to the editor 120 that displays it in a graphical form. In one embodiment, this graphical form includes a timeline that is responsive to either the entire media stream or to individual objects that are embedding in that media stream, and a graph that shows the bit rate at any point in time.

In a step 330, the content creator views the graphical image generated in step 225 (FIG. 2). In the event that the bit rate is excessive, the content creator may choose to alter the image by deleting objects, changing their attributes, inserting them into different places in the media stream (for example in a different time or space). Immediately after the streaming media is edited, the fitter analyzes the new image and steps 215–230 (FIG. 2) may be repeated.

In a step 335, the exporter 140 multiplexes encoded media elements together and generates a file into a form such that it can be transmitted over a communications link 150 to an end user.

Presentation to User

Figure 4:
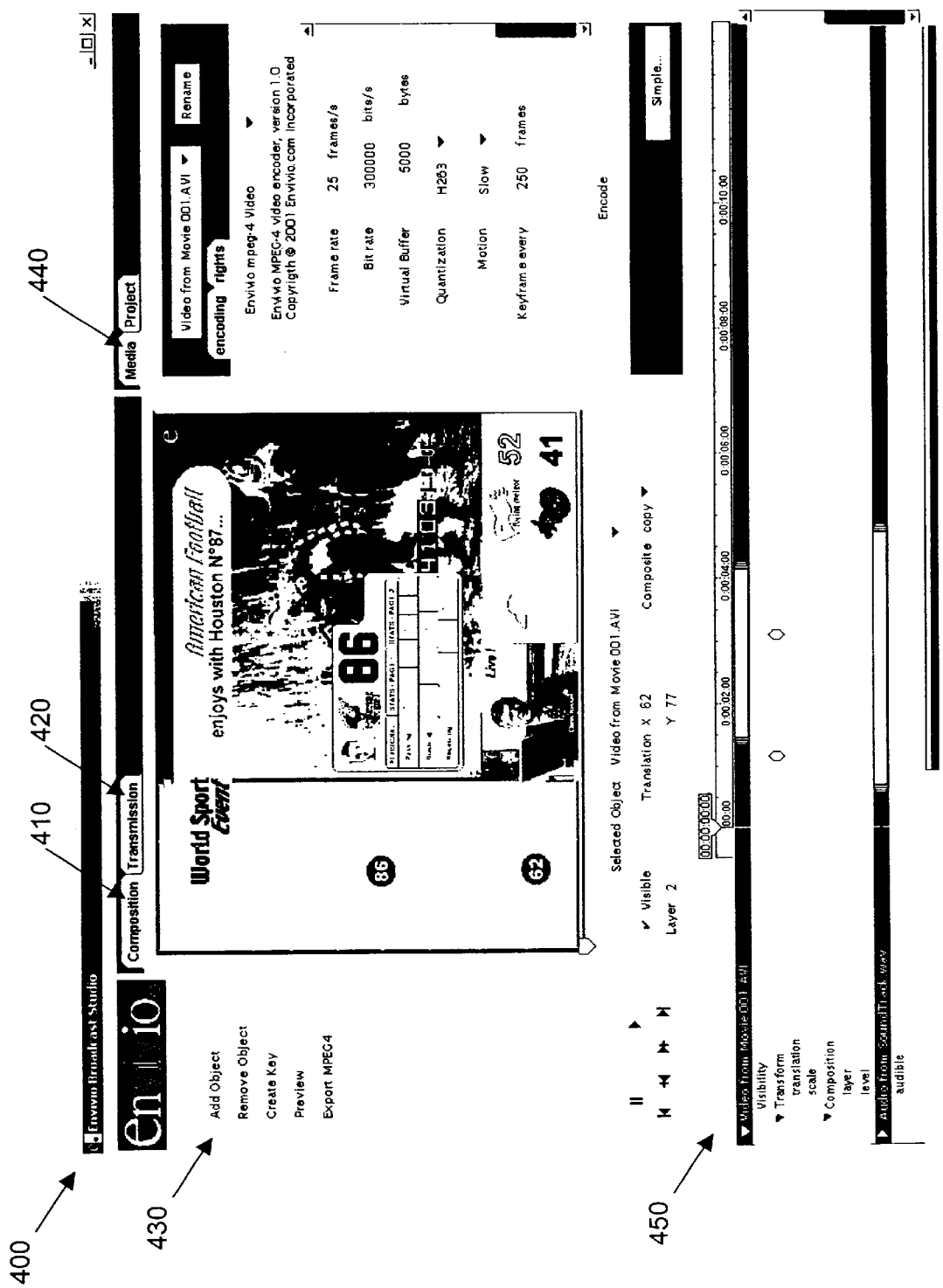
FIG. 4 shows a conceptual diagram of a screen display for interactive streaming media production.

FIG. 4 shows a conceptual diagram of a screen display for interactive streaming media production.

The screen display (shown by general character reference 400) includes a graphical image generated by the fitter 134 and displayed on the editor 120. This graphical image is responsive to a media stream; the content creator can manipulate the media stream so as to tailor it to a particular set of resources.

In a preferred embodiment, the screen display 400 includes a composition tab 410, a transmission tab 420, a set of editing tools 430 and a set of tabs 440 relating to various aspects of encoding, media rights and identifiers and a timeline 450.

The composition tab 410 shows a presentation of the streaming media and one or more objects that are embedded in the streaming media. As shown in FIG. 4, the streaming media includes a video display of a football game. The objects include a newscaster, a weather report, a banner advertisement and a scoreboard. Both the streaming media and the objects included in composition tab 410 are exemplary and in no way limiting.

The transmission tab 420 includes a set of information (not shown) corresponding to the images on the composition tab 410. This set of information includes a graph such that time is represented on the x axis and bitrate is represented on the y axis. By referring to this graph, the content creator can see the original bandwidth usage before optimization, the bandwidth after optimization and the bandwidth associated with particular objection.

The set of editing tools 430 includes control buttons for removing objects, adding objects, exporting the MPEG4, previewing the image, and creating objects.

The set of tabs 440 includes a media tab with various identifiers and a rename function for changing the identifiers. Also included are encoding parameters such as requested frame rate, target bit rate, maximum buffer size, quanitization, speed (slow or fast) and an indication for the placement of key frames.

The timeline 450 represents the life cycle of an object. Although FIG. 4 shows only a single time line, corresponding to the entire media stream, other embodiments includes multiple timelines 450 such that each object is presented by a timeline. A content creator will look at this time lime to determine the spatio-temporal position of objects, as well as their interactive behavior.

Generality of the Invention

The invention has general applicability to interactive computation of resource usage in the design of audiovisual and mixed media presentations, not limited specifically to streaming media, and not necessarily related to the specific applications disclosed herein. For example, embodiments of the invention can include one or more of, or some combination of, the following applications:

Media other than streaming mixed media, such as general purpose data transfer;

Optimization of resource usage when the resources are other than communication bandwidth or buffer space.

Moreover, techniques used by a preferred embodiment of the invention for interactive computation of resource usage can be used in contexts other than the specific applications disclosed herein. For example, techniques used by embodiments of the invention for optimization of sending streaming video objects, fitting resource load within multiple constraints, and presentation of resource load in relation to constraints, are all generally applicable to fields other than the specific applications disclosed herein.

Other and further applications of the invention in its most general form would be clear to those skilled in the art after perusal of this application. The invention would be usable for such other and further applications without undue experimentation or further invention.

Although preferred embodiments are disclosed herein, many variations are possible which remain within the concept, scope and spirit of the invention; these variations would be clear to those skilled in the art after perusal of this application.

What is claimed is:

1. A method for calculating a total necessary communication bandwidth and transmission time corresponding to a stream of mixed media including of multiple media streams, including steps of receiving inputs at a fitter;

determining if it is feasible to send said mixed media in light of said inputs;

dividing the data comprising said mixed media stream into one or more data packets;

determining a minimal send time for each said data packet, wherein said minimal send time is the earliest time said making may be sent while still responding the maximum permitted send ahead time imposed by the network; and assigning a send time to each said data packet.

2. A method as in claim 1, wherein said inputs include a maximum packet size and an available channel bandwidth as a function of time; a time offset of for each said stream, a maximum decoding buffer size, a maximum permitted send-ahead time, and an overhead of transport protocol per packet.

3. A method as in claim 1, including a step of notifying a content creator of the feasibility of sending said mixed media.

4. A method as in claim 1, wherein said step of dividing the data is performed by a fitter.

5. A method as in claim 1, wherein said step of determining a minimum send time includes stimulating a decoding buffer.

6. The method as in claim 5, wherein said minimum send time is set to the maximum of either (1) a date stamp of a current said packet minus the maximum send-ahead time or (2) the datestamp of the packet most recently removed from said decoding buffer.

7. The method as in claim 1, wherein said step of assigning a send time is performed starting with said data packets associated with end of a performance of said mixed media and moving toward said data packets associated with the beginning of a performance of said mixed media.

8. A method as in claim 1, wherein said send time is set to a nominal send time minus the size of said packet divided by the available bandwidth at said nominal send time.

9. A memory storing information including instructions, said instructions executable by a processor, said instructions comprising
importing a media stream,
encoding said media stream;
computing a bit rate associated with one or more elements included in said media stream;
generating a graphical image responsive to said step of computing; wherein said graphical image includes a time display and a set of information on bitrate usage;
updating said time display and said set of information; and
exporting said media stream.

10. A memory as in claim 9, wherein said instruction for encoding includes instructions to convert a format associated with said media stream to an MPEG 4 format.

11. A memory as in claim 9, wherein said instruction for computing includes computing a bit rate that is responsive to a buffer space at an end user, a communication link or a server.

12. A memory as in claim 9, wherein said time display includes a timeline, comprising a life cycle associated with said one or more elements.

13. A memory as in claim 9, wherein said instruction for updating is responsive to one or more changes made in said media stream.

14. A memory storing information including instructions, said instructions executable by a processor, said instructions comprising
receiving inputs at a fitter;
determining if it is feasible to send said mixed media in light of said inputs;
dividing the data comprising said mixed media stream into one or more data packets;
determining a minimal send time for each said data packet, wherein said minimal send time is the earliest time said making may be sent while still responding the maximum permitted send ahead time imposed by the network; and
assigning a send time to each said data packet.

15. A memory as in claim 14 wherein said inputs include a maximum packet size and an available channel bandwidth as a function of time; a time offset of for each said stream, a maximum decoding buffer size, a maximum permitted send-ahead time, and an overhead of transport protocol per packet.

16. A memory as in claim 14, including an instruction of notifying a content creator of the feasibility of sending said mixed media.

17. A memory as in claim 14, wherein said instruction of dividing the data is performed by a fitter.

18. A memory as in claim 14, wherein said instruction of determining a minimum send time includes stimulating a decoding buffer.

19. The memory included in claim 18, wherein said minimum send time is set to the maximum of either (1) a date stamp of a current said packet minus the maximum send-ahead time or the datestamp of the packet most recently removed from said decoding buffer.

20. The memory as in claim 14, wherein said instruction of assigning a send time is performed starting with said data packets associated with end of a performance of said mixed media and moving toward said data packets associated with the beginning of a performance of said mixed media.

21. A memory as in claim 14, wherein said send time is set to a nominal send time minus the size of said packet divided by the available bandwidth at said nominal send time.

22. A method including
composing a mixed media including one or more objects;
calculating a total necessary communication bandwidth and transmission time corresponding to said mixed media;
modifying said mixed media in response to said step of calculating, wherein said step of modifying changes an order of transmission or a specific transmission time for said objects; and
displaying a graphical representation of optimization before and after the step of calculating.

23. A method as in claim 22, wherein said step of modifying includes adding, deleting, or changing the attributes associated with said object.

24. A method as in claim 22, wherein said step of displaying includes displaying a set of different media taking part in the global resource usage.

25. A method as in claim 22, wherein step of displaying includes providing a visual feedback of the download and decoding time required to transfer and decode said mixed media from a server to a player.

* * * * *